United States Patent [19]
Westrick et al.

[11] Patent Number: 6,114,957
[45] Date of Patent: Sep. 5, 2000

[54] PET LOCATOR SYSTEM

[75] Inventors: Michael D. Westrick, Fort Wayne; Scott A. Brune, Leo, both of Ind.

[73] Assignee: Innotek Pet Products, Inc., Garrett, Ind.

[21] Appl. No.: 09/026,058

[22] Filed: Feb. 19, 1998

[51] Int. Cl.[7] .......................... G08B 21/18; G08B 21/22
[52] U.S. Cl. .................. 340/568.1; 340/529; 340/539; 340/573.3; 340/573.4
[58] Field of Search .......................... 340/573.3, 573.4, 340/568.1, 539, 529

[56] References Cited

U.S. PATENT DOCUMENTS

| | | | |
|---|---|---|---|
| 2,881,410 | 4/1959 | Brunn | 340/825.44 |
| 3,336,530 | 8/1967 | Sloan et al. | 340/573.3 |
| 4,177,466 | 12/1979 | Reagan | 342/456 |
| 4,596,988 | 6/1986 | Wanka | 342/457 |
| 4,742,357 | 5/1988 | Rackley | 342/457 |
| 4,799,062 | 1/1989 | Sanderford, Jr. et al. | 342/450 |
| 4,814,751 | 3/1989 | Hawkins et al. | 340/573.4 |
| 4,818,998 | 4/1989 | Apsell et al. | 342/444 |
| 4,961,575 | 10/1990 | Perry | 340/539 |
| 4,980,671 | 12/1990 | McCurdy | 340/573.4 |
| 5,021,794 | 6/1991 | Lawrence | 340/539 |
| 5,067,441 | 11/1991 | Weinstein | 119/29 |
| 5,115,223 | 5/1992 | Moody | 340/573.4 |
| 5,196,825 | 3/1993 | Young | 340/573.4 |
| 5,212,912 | 5/1993 | Foissac | 52/40 |

(List continued on next page.)

OTHER PUBLICATIONS

WatchMate® LC Product Catalogue by Instantel consisting of 4 pages.
WatchMate™ Product Catalogue by Instantel consisting of 6 pages.
Double Protection product brochure by Care Trak, Inc. consisting of 4 pages.
Hertz Supply letter dated Jun. 5, 1997, written by James M. Copp, consisting of 3 pages.
Guardian Net™ product brochure by Guardian Electronics, Inc. consisting of 4 pages.
Care Trak Inc. product brochure for Wrist Transmitter Bracelet consisting of 2 pages.
Secure Care Products™ product brochure for Wandering Resident Systems consisting of 1 page.
WanderGuard® a division of Senior Technologies, Inc. product brochure consisting of 2 pages.
WatchMate™ LC product brochure by Instantel consisting of 2 pages.
WatchMate® System Product brochure by Instantel, 1995, consisting of 4 pages.
The BedNet™ system product brochure consisting of 4 pages.
Secure Care Products Wandering Resident Systems brochure consisting of 1 page.

*Primary Examiner*—Glen Swann
*Attorney, Agent, or Firm*—Taylor & Aust, P.C.

[57] ABSTRACT

A system for locating movable objects and detecting the failure of the object to visit a designated area within a predetermined time, including a base unit, a transceiver attached to the movable object, and a locating device. The base unit includes a transmitter circuit which generates a first signal for substantially continuous transmission within a zone, which encompasses the designated area. When the movable object enters the zone, the receiver portion of the transceiver receives the first signal and resets a timer within the transceiver. If the movable object fails to revisit the zone within the predetermined time, based on predictions of the movable object's movements, the timer times out and switches the transceiver transmitter into an active mode wherein the transceiver emits a second signal. The second signal, which may contain information identifying the movable object, can be detected by using a portable locating device having a directional antenna which is used to track down and recover the movable object. In an alternate embodiment, a fixed mast-mounted locator receiver detects the second signal and provides information regarding the approximate location of the movable object.

39 Claims, 5 Drawing Sheets

U.S. PATENT DOCUMENTS

| | | | |
|---|---|---|---|
| 5,268,670 | 12/1993 | Brasch et al. | 49/502 |
| 5,289,163 | 2/1994 | Perez et al. | 340/573.4 |
| 5,337,041 | 8/1994 | Friedman | 340/573.4 |
| 5,461,390 | 10/1995 | Hoshen | 340/573.4 |
| 5,525,967 | 6/1996 | Azizi et al. | 340/573.4 |
| 5,543,780 | 8/1996 | McAuley et al. | 340/573.4 |
| 5,552,772 | 9/1996 | Janky et al. | 340/573.4 |
| 5,557,259 | 9/1996 | Musa | 340/573.4 |
| 5,589,821 | 12/1996 | Sallen et al. | 340/573.4 |
| 5,603,094 | 2/1997 | Greear, Jr. | 340/573.3 |
| 5,621,388 | 4/1997 | Sherburne et al. | 340/573.4 |
| 5,629,678 | 5/1997 | Gargano et al. | 340/573.4 |
| 5,635,907 | 6/1997 | Bernard et al. | 340/573.4 |
| 5,650,769 | 7/1997 | Campana, Jr. | 340/573.4 |
| 5,652,578 | 7/1997 | Snow | 340/539 |
| 5,686,887 | 11/1997 | Chen et al. | 340/539 |
| 5,714,932 | 2/1998 | Castellon et al. | 340/539 |

PET LOCATOR SYSTEM

BACKGROUND OF THE INVENTION

The present invention relates generally to a locator system, and particularly to a system for locating movable objects, such as animals.

Movable objects, such as animals, regularly visit specific, predictable locations in and/or around the owner's home. For example, animals generally visit a food dish at least one time each day. It is frequently desirable to permit such animals to move freely throughout the day, without regard to their precise location, so long as the animal returns to the particular, designated location within the home according to its predictable, routine behavior. When the animal does not return to the designated location within a predetermined time, it can frequently be assumed, based on the animal's known behavior, that the animal has wandered away and must be located and retrieved. As such, it is desirable to provide a system which enables a transmitter worn by the animal to transmit a signal when the animal fails to visit the designated area within the predetermined time so that the signal can be received by a tracking or locator device.

SUMMARY OF THE INVENTION

The present invention provides a system for tracking and locating a movable object, such as an animal, when the object remains outside a designated area for a predetermined period of time. The system includes a base unit which is a point of source transmitter that is placed in the designated area, such as by the animal's food dish. The system further includes a transceiver worn by the animal that has a receiver which receives an update signal transmitted by the point of source transmitter whenever the animal enters the designated area. The transceiver also includes a timer which is reset each time an update signal is received. If the animal does not enter the designated area (i.e., the timer is not reset by an update signal) within a predetermined time, the timer times out and the transmitter included in the transceiver enters an active mode. When the transmitter is in an active mode, it emits a high frequency tracking signal which can be detected by a directional, portable locator antenna, or a mast-mounted locator antenna.

Other objects, advantages and novel features of the present invention will be apparent upon consideration of the following description of embodiments of the invention and accompanying drawings.

DETAILED DESCRIPTION OF EMBODIMENTS OF THE INVENTION

The embodiments described herein are not intended to be exhaustive or to limit the invention to the precise forms disclosed. Rather, the embodiments selected for description are disclosed so that others skilled in the art may utilize their teachings.

Although the following description presents the system according to the present invention as a system for locating animals, particularly, pets which are kept in or near a home, it should be understood that the invention could readily be adapted, for example, to monitor and locate farm animals, prisoners, children, vehicles, and other movable objects which are to be kept within or routinely visit a specific area.

Figure 1:
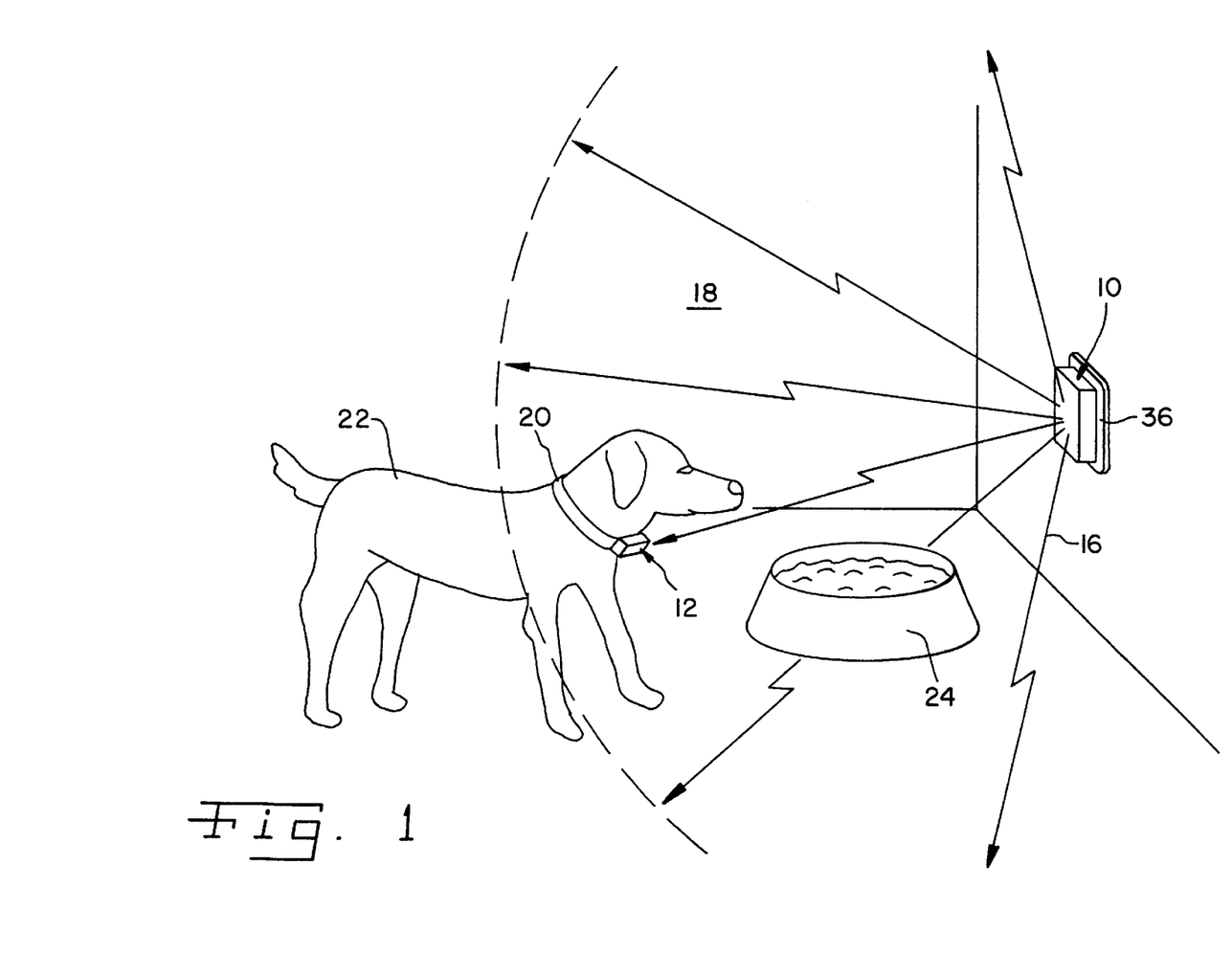
FIG. 1 is a diagrammatic perspective view of components of a locator system according to the present invention shown employed as a pet locator system.

FIG. 1 depicts a pet locating system according to the present invention generally including a base unit 10 and a transceiver 12. Base unit 10 includes a low frequency transmitter circuit 14 which generates and transmits a first signal 16 within a zone 18 which encompasses the designated area. First signal 16 is substantially continuously transmitted and provides the update signal for receipt by the transceiver 12.

Transceiver 12 is mounted to a collar 20 which is adjustably attached to the animal 22. In general, the receiver within transceiver 12 receives first signal 16 (update signal) whenever animal 22 enters zone 18, for example, to eat food within food dish 24. Whenever transceiver 12 receives first signal 16, a timer within transceiver 12 (described in greater detail below) is reset. The time out period for the timer is set, based on the animal's behavioral patterns, such that the owner would expect the animal to visit the designated area within the predetermined time (for example, one day).

Figure 2:
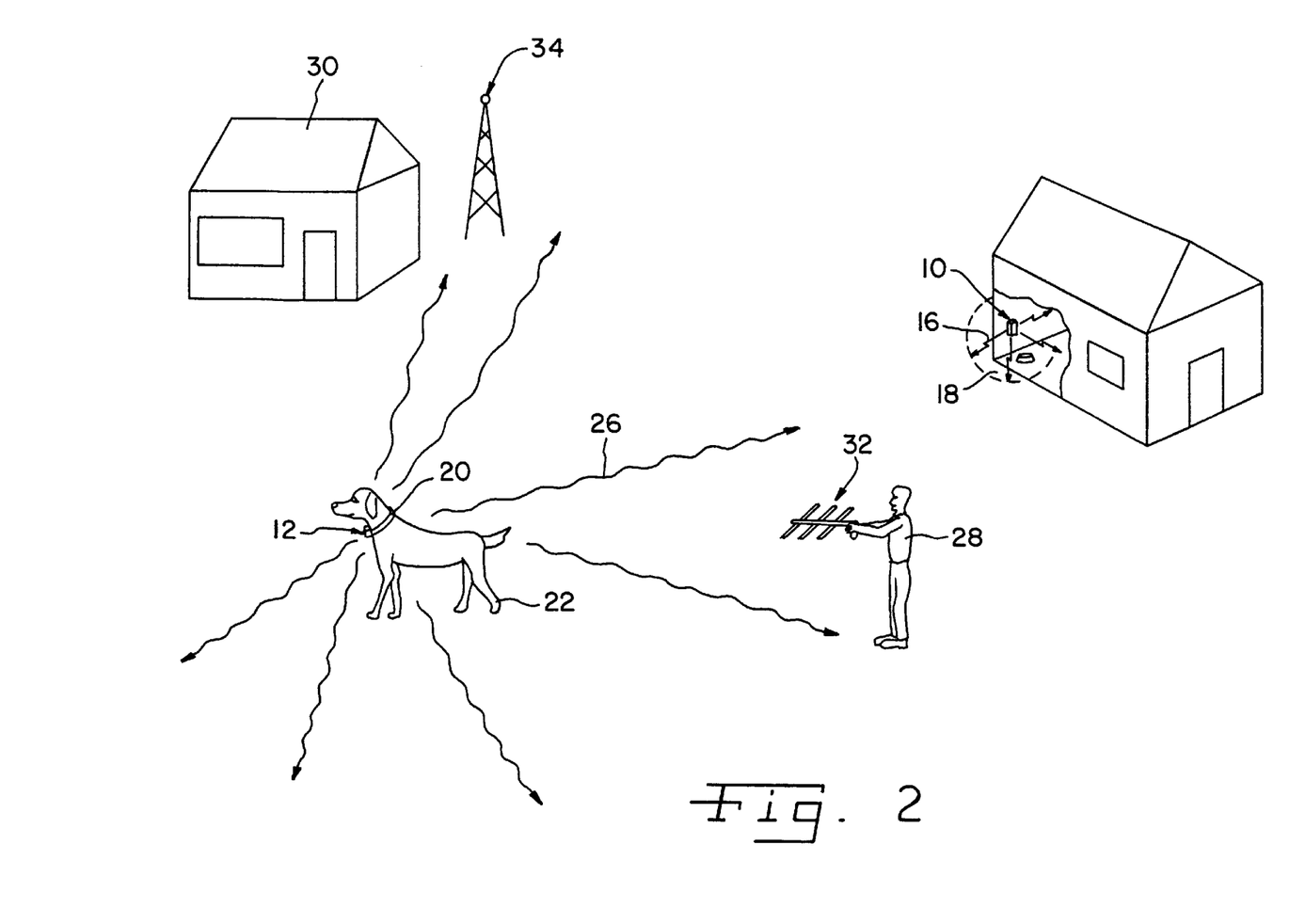
FIG. 2 is a diagrammatic perspective view similar to FIG. 1.

If the animal fails to enter zone 18 within the predetermined time out period, a transmitter within transceiver 12 is switched into an active mode as illustrated in FIG. 2. When in active mode, the transmitter included within transceiver 12 emits a second signal 26 (a tracking signal) as described in greater detail below. Transceiver 12 will continue to emit second signal 26, so long as the battery power for transceiver 12 is sufficient to generate the signal (for example, two to three days).

Once it is determined that the animal has wandered off, the owner 28 can rent a portable locating device or hand held locator 32 from the local pet supply dealer 30. Locator 32 includes a high range, directional antenna as described below. The owner 28 can use the locator 32 to track down and retrieve the animal 22. Alternatively, personnel at the pet supply dealer 30 can operate a mast-mounted, long range locator receiver 34 to provide information on the whereabouts of the animal.

Figure 3:
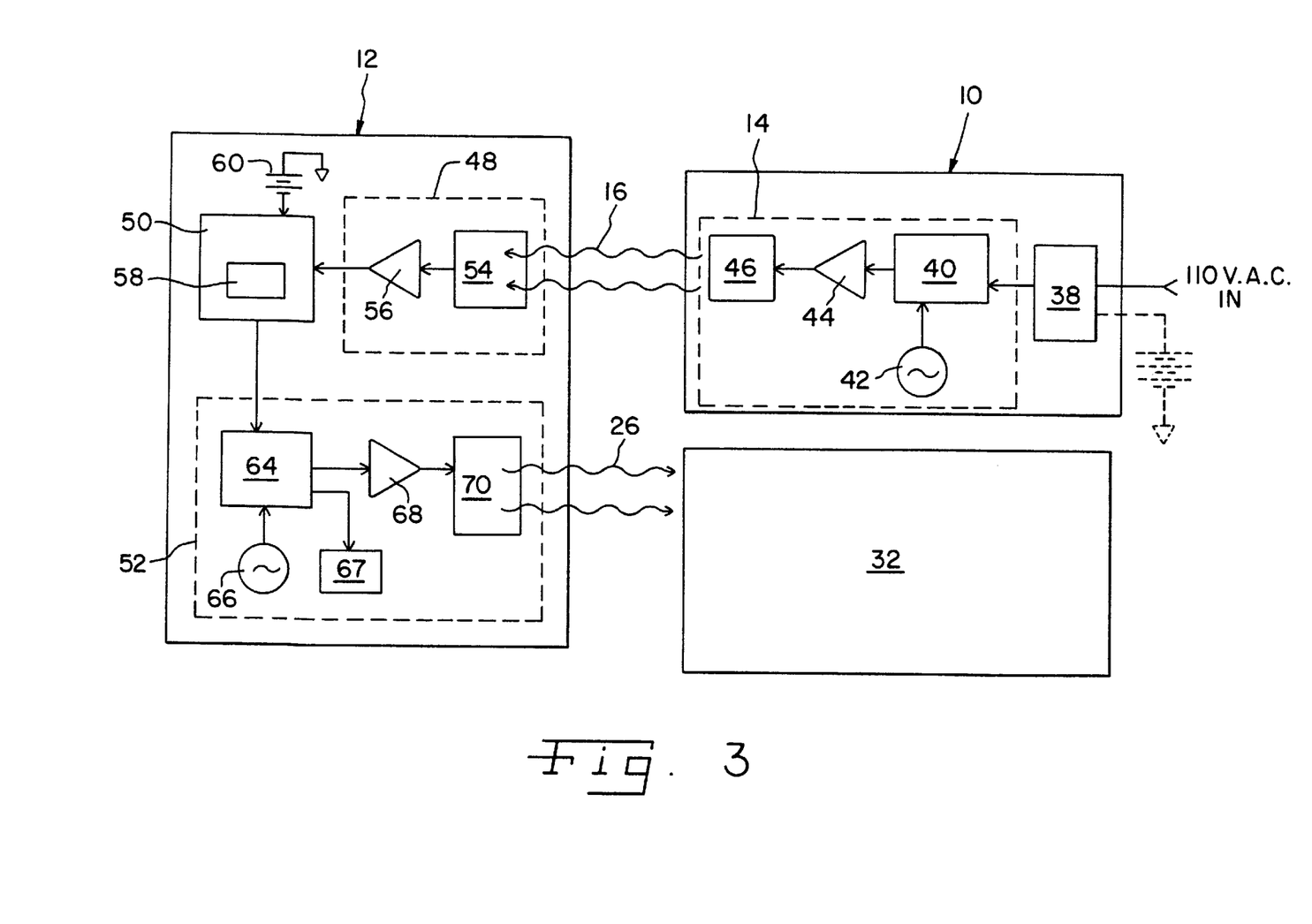
FIG. 3 is a schematic block diagram of the base unit and transceiver shown in FIGS. 1 and 2.

As best shown in FIG. 3, base unit 10 includes a transmitter circuit 14 which is adapted to receive 110 volt, alternating current power from a standard electrical outlet 36. Alternatively, transmitter circuit 14 may be connected to a battery as shown in dashed lines in FIG. 3. The power is routed to a power conditioning circuit 38 which supplies power to the signal generator 40 which is connected to an oscillator 42. Signal generator 40 provides a signal to amplifier 44 which is connected to antenna 46. Antenna 46 transmits first signal 16 which, in an exemplary embodiment, is a pulse code modulated signal at a frequency below approximately 20 kilohertz within zone 18.

Figure 4:
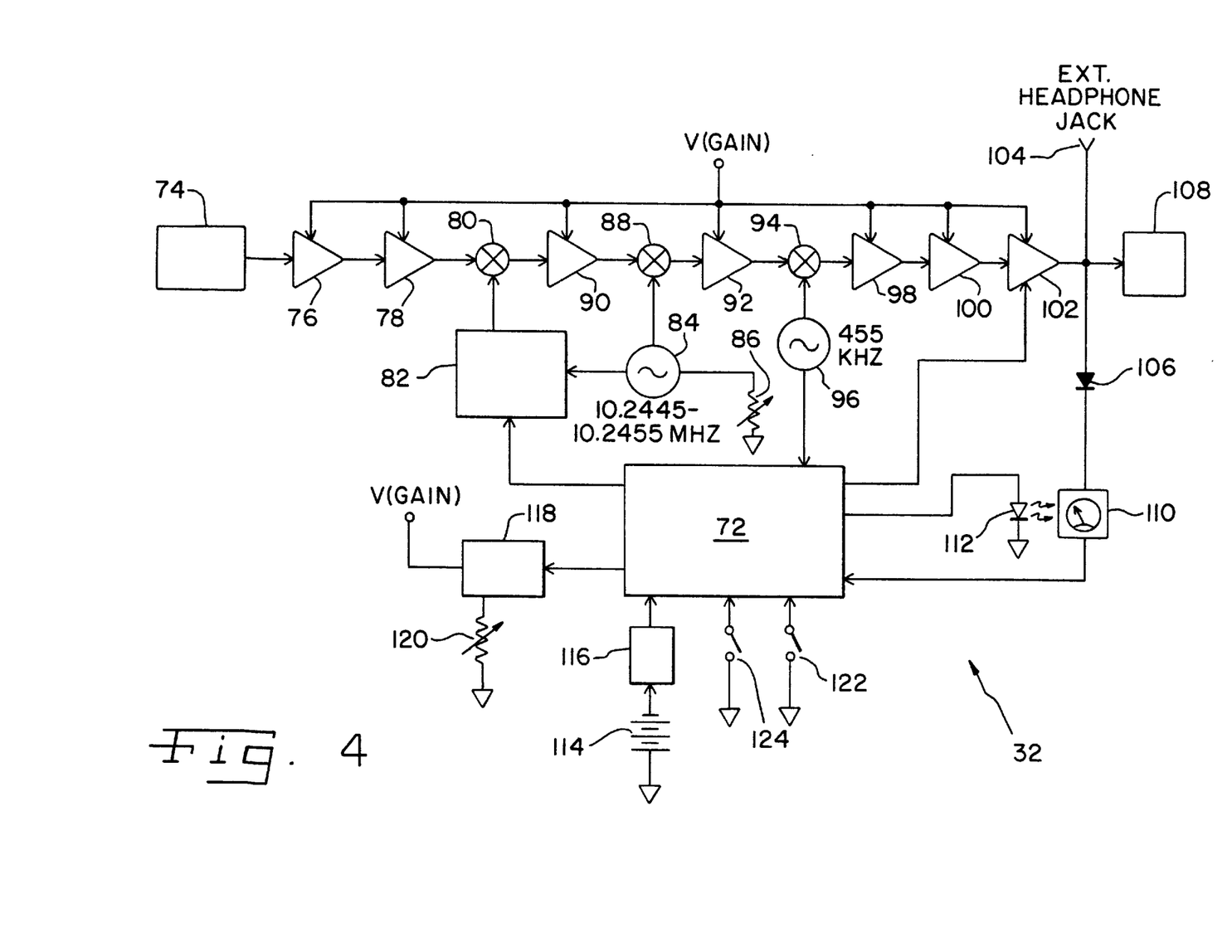
FIG. 4 is a schematic block diagram of the portable locating device shown in FIG. 2.

Transceiver 12 generally includes receiver 48, logic unit 50, and transmitter 52, all housed within a waterproof housing. Receiver 48 includes an antenna 54 for receiving first signal 16. Antenna 54 is connected to an amplifier 56 which is connected to logic unit 50. Logic unit 50 includes a timer 58 and power input from a battery 60. Logic unit 50 is connected to transmitter 52, particularly, to signal generator 64. Signal generator 64 receives a reference signal from oscillator 66. Signal generator 64 is connected to amplifier 68. Amplifier 68 is connected to antenna 70 which emits second signal 26 having a frequency preferably in the range of 216 to 221 megahertz. The second signal 26 or tracking signal is received in an exemplary embodiment by portable locating device 32 as shown in FIG. 4.

Signal generator 64 is also connected to a piezo beeper 67 which beeps (for example, once every second) whenever transmitter 52 is activated. Beeper 67 thus provides an audible indication of the location of animal 22. Beeper 67 is also used in the "battery low" indicator function of transceiver 12. Logic unit 50 stores information regarding the number and duration of transmission events. Based on the available power from battery 60 and the power consumption of transceiver 12, one can readily determine the total "activated" life of the battery. Logic unit 50 is programmed with this information and enables beeper 67 when it determines, based on the stored operational data, that battery 60 is nearly spent. Beeper 67 will continue to beep until battery 60 is drained which may be, for example, two months.

Portable locating device 32 features a microcontroller 72 (e.g., MC68HC705J1A), and an antenna 74 which is a direction finding, three element antenna for receiving signals within the frequency range of 216–220 megahertz (sometimes referred to as a superheterodyne, direction-finding receiver). The signal from antenna 74 is amplified by amplifier 76 and routed to harmonic filter/amplification stage 78, which includes a 216–220 megahertz filter. Stage 78 is connected to summing junction 80 which also receives an input from signal processing section 82. A voltage controlled oscillator 84 provides an input to signal processing section 82 and summing junction 88. Oscillator 84 is connected to tuner frequency control potentiometer 86 which permits fine adjustment of the oscillator output signal within a 5 kilohertz range from 10.2445 to 10.2455 megahertz. The output of summing junction 80 is connected to harmonic filter/amplification stage 90 which includes a 10.7 megahertz filter having a 15 kilohertz bandwidth. Filter/amplification stage 90 is also connected to summing junction 88. The output of summing junction 88 is connected to harmonic filter/amplification stage 92 which includes a 455 kilohertz filter having a 15 kilohertz bandwidth. Summing junction 94 combines the output of filter/amplification stage 92 and the signal from 455 kilohertz oscillator 96. Oscillator 96 also provides a 455 kilohertz reference signal to microcontroller 72. Summing junction 94 is connected to amplifier 98 which, in turn, is connected to harmonic filter/amplification stage 100. Stage 100 includes a 300 hertz base band filter. An additional 300 hertz base band filter is included in filter/amplification stage 102, which also receives a 1 kilohertz on/off channel tone from microcontroller 72. The output of the receiver section of portable locating device 32 is provided to an external headphone jack 104, a signal detector 106, and a 1 kilohertz piezo speaker 108. Detector 106 is connected to signal strength meter 110 which is operably associated with back light LED 112. The output of the 220 megahertz receiver is fed back to microcontroller 72.

Portable locating device 32 is powered by a 9 volt alkaline battery 114 which is fed through a voltage regulator 116 to provide the appropriate voltage level for the locator electronics. The amplification stages included in the receiver section of locating device 32 have adjustable gains. The gain of these amplifiers is controlled by the voltage output of adjustable voltage regulator 118. By manually adjusting signal attenuator 120, output voltage V (GAIN) is varied by adjustable voltage regulator 118. Consequently, the operator can adjust the gain of the receiver relative to the signal strength of the second signal 26 received by antenna 74. Finally an on/off switch 122 and a back light control switch 124 are connected to microcontroller 72.

In operation, base unit 10 is plugged into a 110 volt outlet 36 within the pet owner's home located near an area regularly visited by animal 22. Base unit 10 then generates and transmits a low frequency (e.g., 10 kilohertz) first signal 16. The strength of first signal 16 decreases with distance from base unit 10. Zone 18 defines the distance from base unit 10 within which first signal 16 can be detected by transceiver 12 (typically around 10 feet). Power conditioning circuit 38 of base unit 10 receives the 110 volt a/c power input and conditions the power signal to produce a usable signal for powering transmitter circuit 14. Signal generator 40, based on its reference signal from oscillator 42, produces a low level signal according to practices well known in the art. The low level signal is amplified by amplifier 44 and transmitted as first signal 16 by antenna 46.

When animal 22 enters zone 18, transceiver 12 detects the presence of first signal 16. Transceiver 12 begins normal functioning (i.e., exits initial "standby" mode as shipped). Specifically, antenna 54 of receiver 48 receives first signal 16, which is in turn amplified by amplifier 56. Amplifier 56 provides an update signal to logic unit 50, thereby resetting timer 58. Timer 58 begins counting down its predetermined time limit (e.g., 24 hours). As mentioned above, the predetermined time limit is based on the known behavior of the animal or may be set to a default value. Such a timer setting can be accomplished according to various practices well known in the art. Since receiver 48 continuously detects the presence of first signal 16, timer 58 is continuously reset or updated so long as animal 22 remains within zone 18.

When animal 22 leaves zone 18 to go about its daily activities, timer 58 begins counting down the predetermined time limit. If animal 22 does not return to zone 18 (to receive an update signal) within the predetermined time limit, timer 58 enables transmitter 52 of transceiver 12. Specifically, signal generator 64 generates a signal based on reference oscillator 66 which is amplified by amplifier 68 using principles and practices commonly known in the art. The signal from amplifier 68 is transmitted as a high frequency signal (e.g., 220 megahertz) by antenna 70. This signal, second signal 26, is transmitted substantially continuously until battery 60 drains or switch 62 is switched off. As mentioned above, second signal 26 is generated only after animal 22 has deviated from its established behavioral patterns and is roaming. Second signal 26 provides a beacon or tracking signal to facilitate the location and recovery of animal 22. Signal generator 64 also activates beeper 67 which provides an audible indication of the location of animal 22.

Once pet owner 28 obtains a portable locating device 32, the owner simply points the device in various directions to determine the approximate location of animal 22. The high frequency second signal 26 is received by directional antenna 74 at a higher intensity when antenna 74 is directed toward transceiver 12. If animal 22 has traveled a relatively great distance from home, the owner 28 can adjust signal attenuator 120 to its maximum position, thereby causing adjustable voltage regulator 118 to output a voltage level corresponding to maximum gain in the amplification stages of locating device 32. When V (GAIN) is at its maximum level, locating device 32 is most sensitive and can receive even relatively weak second signals 26. The signal received by antenna 74 is amplified at amplification stage 76 and then passed through the 216–220 megahertz filter of harmonic filter/amplification stage 78. The filtered output of stage 78 is then summed with the output of signal processing section 82 at summing junction 80 and passed through the 10.7 megahertz bandpass filter included in the filter/amplification stage 90. The output of stage 90 is combined with the output of voltage controlled oscillator 84.

The output frequency of voltage controlled oscillator 84 can be adjusted by adjusting frequency control potentiometer 86. The range of adjustment, in an exemplary embodiment, is plus or minus 5 kilohertz. This adjustment permits fine tuning of the receiver to compensate for frequency drift of transmitter 52 and the internal oscillators of locating device 32.

The output of summing junction 88 is then passed through a 455 kilohertz bandpass filter and amplified at filter/amplification stage 92. This filtered signal is combined with the output of the 455 kilohertz reference oscillator 96 at summing junction 94. The resultant signal is amplified at amplifier 98 and passed through filter/amplification stages 100, 102. The final output of this receiver portion of locating device 32 excites speaker 108 which emits an audible 1 kilohertz peak tone. After the signal is passed through detector 106, it is provided as an input to meter 110. Meter 110 provides a visual indication of the signal strength and could be analog or digital, having various configurations. As is commonly employed in this and related fields of art, the visual feedback provided by the meter assists the operator in aiming portable locating device 32 to further pinpoint the position of animal 22. When locating device 32 is pointed directly at animal 22, the position of the needle on meter 110 will correspond to maximum signal strength. Portable locating device 32 can be operated at night or under low light conditions by switching on switch 124, thereby causing microcontroller 72 to excite the back light LED 112 which emits light to illuminate the face of meter 110. Additionally, the operator can receive audible feedback on the position of animal 22 by using headphones which are plugged into external headphone jack 104.

As owner 28 becomes nearer and nearer animal 22, the strength of second signal 26 transmitted by transceiver 12 increases. Owner 28 can decrease the gain of the amplification stages in portable locating device 32 using signal attenuator 120 to maintain the received signal within the operating range of the receiver. Eventually, owner 28 will establish visual contact with animal 22. Once animal 22 is recovered, transceiver 12 can be deactivated by bringing transceiver 12 within zone 18 or otherwise providing a first signal 16.

Alternatively, a mast-mounted, long range locator receiver 34 may be used to receive second signal 26 and provide information regarding the approximate location of animal 22. Locator receiver 34 is essentially the same receiver circuit as hand-held receiver 32. The large, mast-mounted antenna, which typically rotates 360° on a tower, replaces antenna 74 of hand-held receiver 32. While the hand-held receiver may have a range of 8–10 miles, a mast-mounted receiver may have a range of 50–60 miles.

Figure 5:
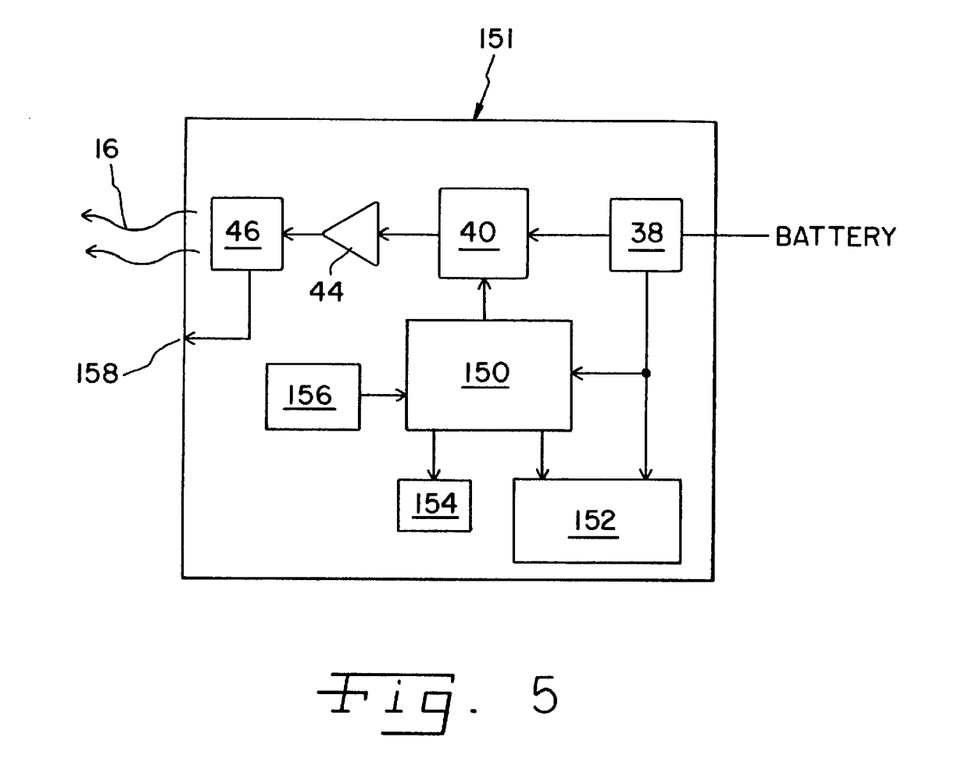
FIG. 5 is a schematic block diagram of a display/programming unit used in an alternate embodiment of the present invention.

In an alternate embodiment of the present invention, a display/programming unit 151 includes a microcontroller 150, a display 152, an audible alarm 154, and a keyboard 156, as shown in FIG. 5. Microcontroller 150 may be a standard, programmable microcontroller, such as a MC68HC705J1A. Using common programming practices, keyboard 156 and display 152, which may be a 20 character, two line, liquid crystal display, microcontroller 150 may be programmed to provide a particular first signal 16 to transceiver 12 which programs logic unit 50 such that logic unit 50 generates a second signal 26 which is encoded with information that identifies that particular transceiver 12 (i.e., an ID signal). Display/programming unit 151 is connected to hand-held receiver 32 to identify the particular second signal 26 corresponding to a particular collar. Display/programming unit 151 is connected to external headphone jack 104 of hand-held receiver 32 which supplies display/programming unit 151 with the demodulated audio signal from transceiver 12. Once transceiver 12 is programmed to supply the proper ID signal (i.e., second signal 26), and the display/programming unit 151 is connected to receiver 32, then display 152 provides substantially positive electronic identification of the animal 22 wearing a particular transceiver 12.

Transceiver 12 would be programmed before initial operation according to the above-described procedure. As explained above, transceiver 12 remains in a standby mode until it receives an initial first signal 16 from base unit 12. Once this first reset signal is received, transceiver 12 begins normal functioning. When transceiver 12 enters an active mode, it emits a second signal 26 which identifies the animal 22.

In addition to programming transceivers 12 with electronic identification information, display/programming unit 151 of this embodiment may be used to program transceivers 12 with predetermined time period data corresponding to a particular animal. Thus, if an animal's behavioral patterns change, or if a collar 20 is worn by a different animal, the operator may program transceiver 12 with a predetermined time (i.e., activation time limit) corresponding to the present behavioral patterns of the animal.

While the present invention has been described as a locator system for use with animals, and more particularly, house pets, it is to be understood that the general principles disclosed herein are readily applicable to other situations wherein it is desirable to detect the absence of a "movable object" and to locate the object once it is determined to be absent. For example, the present invention could readily be used to track the location of humans such as prisoners, vehicles such as rental cars, and objects such as books in a library.

While this invention has been described as having exemplary embodiments, this application is intended to cover any variations, uses, or adaptions using its general principles. Further, this application is intended to cover such departures from the present disclosure as come within the known or customary practice within the art to which it pertains. The spirit and scope of the invention are to be limited only by the terms of the appended claims.

What is claimed is:

1. A system for locating movable objects, comprising:
    a transmitter circuit, the transmitter circuit generating a first signal for transmission within a zone;
    a transceiver attached to the movable object, the transceiver including a receiver capable of receiving the first signal when the movable object is within the zone, a timer responsive to the receiver for measuring elapsed time between received first signals, and a transmitter being switched by the timer into an active mode when the elapsed time exceeds a predetermined time limit, the transmitter transmitting a second signal when in the active mode; and
    a programming unit configured for remotely programming said transceiver.

2. A system according to claim 1 wherein the transmitter circuit is connected to a 110 volt alternating current power source.

3. A system according to claim 1 wherein the transmitter circuit is connected to a battery.

4. A system according to claim 1 further comprising a collar for adjustable attachment to the movable object, the transceiver being connected to the collar.

5. A system according to claim 1 wherein the zone is approximately 10 feet in diameter.

6. A system according to claim 1 wherein the transmitter circuit continuously transmits the first signal as a pulse code modulated signal at a frequency below approximately 20 kilohertz.

7. A system according to claim 1 wherein the transceiver further includes a waterproof housing which encloses the receiver, the timer, and the transmitter.

8. A system according to claim 1 wherein the transceiver transmitter transmits the second signal at a frequency in the range of approximately 216 to 221 megahertz.

9. A system according to claim 1 wherein the transceiver is programmable.

10. A system according to claim 1 wherein the second signal contains identification information to identify the transceiver.

11. A system according to claim 1 wherein the transceiver includes a beeper.

12. A system according to claim 1 wherein the transceiver is connected to a battery.

13. A system according to claim 12 wherein the transceiver indicates a low power condition of the battery.

14. A system according to claim 1 further comprising a locating device for receiving the second signal, thereby permitting location of the movable object.

15. A system according to claim 14 wherein the locating device is connected to a display.

16. A system according to claim 14 wherein the locating device is connected to a keyboard.

17. A system according to claim 14 wherein the locating device is portable.

18. A system according to claim 14 wherein the locating device is a super-heterodyne, direction-finding receiver.

19. A system according to claim 14 wherein the locating device includes a meter to indicate the signal strength of the second signal.

20. A system according to claim 14 wherein the locating device includes a tuner for adjusting the reception frequency of the locating device.

21. A system according to claim 1 further comprising a stationary locating device for receiving the second signal.

22. A system according to claim 1 further comprising a mast-mounted locating device for receiving the second signal.

23. A system for locating movable objects, comprising:
a transmitter circuit, the transmitter circuit generating a first signal for transmission within a zone;
a transceiver attached to the movable object, the transceiver including a receiver capable of receiving the first signal when the movable object is within the zone, a timer responsive to the receiver for measuring elapsed time between received first signals, and a transmitter being switched by the timer into an active mode when the elapsed time exceeds a predetermined time limit, the transmitter transmitting a second signal when in the active mode; and
a locating device for receiving the second signal, thereby permitting location of the movable object, the locating device including a receiving section and an adjustable attenuator for varying a gain of the receiving section.

24. A system for locating movable objects, comprising:
a transmitter circuit, the transmitter circuit generating a first signal for transmission within a zone;
a transceiver attached to the movable object, the transceiver including a receiver capable of receiving the first signal when the movable object is within the zone, a timer responsive to the receiver for measuring elapsed time between received first signals, and a transmitter being switched by the timer into an active mode when the elapsed time exceeds a predetermined time limit, the transmitter transmitting a second signal when in the active mode; and
a stationary, mast-mounted locating device for receiving the second signal.

25. A system for locating movable objects, comprising:
a transmitter circuit including a signal generator, an oscillator, and an antenna for transmitting a first signal within a zone encompassing an area regularly visited by the movable object; and
a transceiver attached to the movable object and connected to a battery, said transceiver including a receiver having an antenna for receiving the first signal when the movable object is within the zone, a timer which begins measuring time whenever the receiver stops receiving the first signal, and a transmitter connected to the timer having a signal generator, an oscillator, an antenna for transmitting a second signal whenever the measured time exceeds a predetermined time limit, and a beeper for indicating a low power condition of the battery.

26. A system according to claim 24 wherein the transceiver is connected to a collar which is worn by the movable object.

27. A system according to claim 24 wherein the transceiver is programmable.

28. A system according to claim 26 wherein the second signal contains identification information to identify the transceiver.

29. A system according to claim 24 further comprising a locating device for receiving the second signal.

30. A system according to claim 30 wherein the locating device is portable and includes a super-heterodyne direction-finding receiver.

31. A method for locating movable objects, comprising the steps of:
providing a transmitter circuit which generates a first signal for transmission within a zone;
providing a transceiver for attachment to the movable object, the transceiver including a receiver capable of receiving the first signal when the movable object is within the zone;
setting a timer responsive to the receiver for measuring the elapsed time between received first signals;
switching a transmitter responsive to the timer into an active mode when the elapsed time exceeds a predetermined time limit;
causing the transmitter to transmit a second signal when in the active mode;
providing a locating device for receiving the second signal, thereby permitting location of the movable object; and
providing a tuner connected to the locating device for manually adjusting the reception frequency of the locating device.

32. The method of claim 31 further comprising the step of connecting the transceiver to a collar for adjustable attachment to the movable object.

33. The method of claim 31 wherein the step of providing a transmitter circuit includes continuously transmitting the first signal as a pulse code modulated signal at a frequency below approximately 20 kilohertz.

34. The method of claim 31 wherein the step of transmitting a second signal includes transmitting the second signal at a frequency in the range of approximately 216 to 221 megahertz.

35. The method of claim 31 wherein the step of transmitting a second signal includes transmitting a second signal containing identification information to identify the transceiver.

36. The method of claim 31 further comprising the step of connecting the transceiver to a battery.

37. The method of claim 36 further comprising the step of indicating a low power condition of the battery.

38. The method of claim 31 further comprising the step of providing a meter connected to the locating device to indicate the signal strength of the second signal.

39. A method for locating movable objects, comprising the steps of:

providing a transmitter circuit which generates a first signal for transmission within a zone;

providing a transceiver for attachment to the movable object, the transceiver including a receiver capable of receiving the first signal when the movable object is within the zone;

setting a timer responsive to the receiver for measuring the elapsed time between received first signals;

switching a transmitter responsive to the timer into an active mode when the elapsed time exceeds a predetermined time limit;

causing the transmitter to transmit a second signal when in the active mode; and providing a stationary, mast-mounted locating device for receiving the second signal.

* * * * *